(12) United States Patent
Curkendall et al.

(10) Patent No.: US 6,342,839 B1
(45) Date of Patent: Jan. 29, 2002

(54) METHOD AND APPARATUS FOR A LIVESTOCK DATA COLLECTION AND MANAGEMENT SYSTEM

(75) Inventors: Leland D. Curkendall, Longmont, CO (US); William R. Pape, Los Ojos, NM (US)

(73) Assignee: Aginfolink Holdings Inc. (BV)

( * ) Notice: Subject to any disclaimer, the term of this patent is extended or adjusted under 35 U.S.C. 154(b) by 0 days.

(21) Appl. No.: 09/036,564

(22) Filed: Mar. 9, 1998

(51) Int. Cl.⁷ .............................................. G08B 23/00
(52) U.S. Cl. .................... 340/573.3; 340/5.8; 340/539; 340/691.1; 340/693.5
(58) Field of Search ........................... 340/573.3, 573.1, 340/825.34, 10.1, 505, 691.1, 815.65, 5.8, 693.5, 539; 128/903; 119/51.02

(56) References Cited

U.S. PATENT DOCUMENTS

| | | | | |
|---|---|---|---|---|
| 4,247,758 A | * | 1/1981 | Rodrian | 377/6 |
| 4,463,353 A | * | 7/1984 | Kuzara | 340/10.34 |
| 4,475,481 A | * | 10/1984 | Carroll | 119/51.02 |
| 4,854,328 A | * | 8/1989 | Pollack | 128/903 X |
| 5,235,326 A | * | 8/1993 | Beigel et al. | 340/10.41 |
| 5,252,962 A | * | 10/1993 | Urbas et al. | 340/870.17 |
| 5,315,505 A | * | 5/1994 | Pratt et al. | 128/903 X |
| 5,526,772 A | * | 6/1996 | Curkendall | 119/174 |
| 5,673,647 A | * | 10/1997 | Pratt | 119/51.02 |
| 5,857,434 A | * | 1/1999 | Andersson | 119/859 |
| 5,996,529 A | * | 12/1999 | Sissom et al. | 119/14.14 |
| 6,012,415 A | * | 1/2000 | Linseth | 119/174 |

* cited by examiner

*Primary Examiner*—Thomas Mullen
(74) *Attorney, Agent, or Firm*—Rick B. Yeager

(57) ABSTRACT

An efficient method and apparatus for livestock data collection and management is described to provide quality assurance source verification data and performance tracking for individual animals throughout the production cycle. The preferred embodiment includes unique radio frequency identification (RFID) transponders for each animal; unique RFID transponders for animal events; default event data capability; a portable and wireless RFID reader to read the animal and event transponders; a multiple input/output device to accept the reader signals and livestock measurement data and to communicate by means of a wireless radio communication to a host computer; a feedback signal from the host computer to acknowledge receipt of data; BeefLink™ software to provide data gathering, storage, and query support, and a protocol converter to facilitate the transfer and sharing of data between different livestock databases.

39 Claims, 10 Drawing Sheets

METHOD AND APPARATUS FOR A LIVESTOCK DATA COLLECTION AND MANAGEMENT SYSTEM

CROSS REFERENCES AND RELATED APPLICATIONS

Application Ser. No. 09/544,388 is a Divisional Application of this application for a non-elected species.

BACKGROUND OF THE INVENTION

1. Field of the Invention

This invention relates to a method and apparatus for enabling an integrated electronic system for tracking processing events for a meat animal from its conception to its consumption, by using data entry devices that minimize keyboard entry and multiple interconnected databases such that a particular animal history can provide both quality assurance source verification and performance tracking.

2. Description of Related Art

Overview

There is a need, for both economic and quality assurance reasons, for an efficient and cost-effective method for identifying and tracking livestock, and for the monitoring of the processing of those livestock. Throughout the livestock production and processing cycle, there is a need for more detailed information so that ranchers, stockmen, feedlots, and packers, distributors and retailers can make informed decisions about factors and variables such as genetics, herd management, purchasing, feed strategies, and ship dates. Producer their animal performance can realize greater returns with performance based compensation when accurate information about the history and the value of each animal is easily available.

There is also a growing concern about quality assurance in the livestock processing cycle; and there is an opportunity for producers and processors who can establish that quality assurance to improve their compensation. Effective quality assurance programs such as HACCP, or Hazards Analysis and Critical Control Points, programs require accurate and timely information about the history of each animal.

The Beef Industry

The beef industry is a good example of the livestock industry. Traditionally, there are four segments to the U.S. beef industry: the cow/calf producer, the stockman, the feedlot, and the packer.

The commercial cow/calf producer has a herd of mother cows that are used to produce calves. The cows are bred to bulls so that, ideally, each cow has a new calf each year. The calf crop that is produced each year is used primarily for meat production, with some calves retained as replacements for the herd. The calves are usually weaned from their mothers at between six and eight months of age. The traditional producer will sell his animals once they are weaned. Typically, the main objectives of the producer are to have a calf from each cow each year; to have healthy, vigorous calves with the highest weaning weights at the lowest cost; and to produce the best meat, by factors such as tenderness and taste, at the lowest cost.

In order to support these objectives, the producer is interested in efficient systems for identifying and tracking individual animals as they rotate through the producer's pastures; identifying which animals have a good calving history; monitoring the performance of various pastures; recording calf birth date and birth weight statistics and tracking the genetic history of each animal; evaluating the performance of calves from particular cows or bulls; recording the weaning date and weaning weight of each animal; and recording treatments, vaccinations, and other significant or events that have occurred in the animal's life.

The stockman receives the weaned calves when they weigh approximately 500 pounds, and feeds them for four to six months until they weigh 700 to 800 pounds. The stockman's typical objective is to add weight as fast as possible, while keeping the animals healthy. In order to support these objectives, the stockman is interested in collecting and using information such as identifying and tracking individual animals as they rotate through the stockman's pastures; recording beginning, ending, and periodic weight measurements and treatments; and recording vaccinations and other significant events that have occurred in the animal's life in order to track of the success of treatments as well as to eliminate duplicate treatments.

After the stockman phase, the animals are typically sent to a feedlot where they are fed a high-energy diet for about 120 days. At the feedlot, the cattle are in a finishing stage, where the main objective is to add pounds quickly while keeping the animals healthy. The cattle will be finished when they reach a weight of approximately 1,100 to 1,200 pounds. The feedlot is interested in animal weight gain, animal health, the effectiveness of various feed ration formulations, required waiting periods on shipping animals after drug treatments, and animal origin and history.

The slaughter facility or packer typically slaughters the animal and then chills, ages and cuts the carcass into the various cuts of meat and packs those cuts for shipment to distributors and retailers. The packer also provides grade and yield ratings for the carcass. Important quality factors include the live animal weight, the carcass weight, a chilled weight; and the yield, grade, and quality of the carcass and carcass defects. The information collected by the packer is important to all of the upstream participants, because it allows them to adjust their management practices based on the actual quality and economic result for each animal. The upstream data is important to the packer because it permits the packer to select animals that produce the results desired by his customers.

Typically, each of these four segments, the cow/calf producer, the stockman, the feedlot, and the packer, have attempted to optimize their own operations, and there has been relatively little emphasis on cooperative optimization efforts. There is a growing recognition across these industry segments, however, that for both quality assurance reasons and for the improvement of the industry in general, it is desirable to attempt improved data collection and data management.

Variability and Quality Control

There is variability in individual animal production efficiency and in individual carcass quality characteristics such as weight, frame size, muscling, fat content, marbling, and feed efficiency. This variation is due to a combination of genetic factors and environmental factors such as health and drug treatments, nutrition, and growth history. Many of the genetic and environmental factors can be controlled or managed to improve both quality and economic return on investment if accurate historical information were available throughout the production cycle.

The livestock industry has recognized that certain livestock species and breeds outperform other species during production and processing. The prior art has used data collection systems and statistical analysis of data related to livestock breeds in order to identify higher performance breeds. There is a need to extend this data collection so that individual producers can make informed decisions about individual breeding animals in order to further improve their herds.

Electronic Identification

Although it is possible to use manual identification methods for livestock and to employ manual data entry methods, it is desirable to automate the identification and data entry in order to reduce expense and to improve accuracy of the data. These devices typically produce either a unique alphanumeric code or a unique decimal code.

Electronic identification devices and systems have provided a good method for providing identification of livestock. Typically, electronic identification systems utilize a passive electronic identification device that is induced to transmit its identification signal by an externally radiating source. These passive electronic identification devices may be a transponder carried with the individual animal on a collar as illustrated and described in Carroll U.S. Pat. No. 4,475,481, issued Oct. 9, 1984, entitled "Identification System" and in Kuzara U.S. Pat. No. 4,463,353, issued Jul. 31, 1984, entitled "Animal Feeding and Monitoring System"; in an ear tag such as those commercially available from Destron/Fearing, Inc. Allflex USA, Inc. and Avid Marketing, Inc.; in a transponder implanted in the animal as illustrated and described in Pollack U.S. Pat. No. 4,854,328, issued Aug. 8, 1989, entitled "Animal Monitoring Telltale and Information System" and in Hanton U.S. Pat. No. 4,262,632, issued Apr. 21, 1981, entitled "Electronic Livestock Identification System"; or in a bolus such as illustrated and described in U.S. Pat. No. 4,262,632, issued Apr. 21, 1981, entitled "Electronic livestock identification system" by John P. Hanton and Harley A. Leach.

Although electronic identification through radio frequency identification (RFID) tags or barcodes are used in some phases of the livestock production cycle, there is a need to provide a means for individual animal identification throughout the production cycle and to minimize the difficulty of data entry throughout the industry.

RFID Readers

Several RFID readers are commercially available, typically from the transponder suppliers, including models form Destron/Feating, Inc., Allflex USA, Inc. and Avid Marketing, Inc.

An object of the present invention is to provide an improved reader that supports the objectives of the livestock data collection and management system. The prior art includes RFID readers that can distinguish multiple types of RFID transponders as illustrated and described in U.S. Pat. No. 5,235,326, issued Aug. 10, 1993, "Multi-mode, identification system" to Michael L. Beigel, Nathaniel Polish, and Robert E. Malm.

This invention features a reader which can recognize multiple types of transponders; that is designed to be hand held in a working chute environment, such that it is rugged and moisture resistant, that has a sealed switch; and that communicated over greater distance to a host computer or data consolidation device.

The preferred flashlight shape permits a familiar and convenient object to be held by the user.

The rigid body permits the reader to be placed into an alleyway, cage, or chute. Some currently available readers offer stick-type, RFID antennas that can be placed into a pen or chute, and a cable connecting the antenna to a separate enclosure with a hand-held or lap-top computer. In these designs, the cable interface to the antenna is typically a weak point which will break down from repeated mechanical strain. The RFDC eliminates cables and, therefore, the physical weak point. It also allows the unit to be a compact, easy-to-handle devices without unwieldy cables that tangle and interfere with the user's job. The RFDC communications provide the user improved range and flexibility in the work area.

With the addition of audio feedback and especially with wireless headphones, the user becomes completely mobile while performing tasks. The user now room up and down an Alleyway, scanning cows and entering the results of pregnancy checks, scanning steers as they're sorted to various locations, or other tasks.

Databases and Management Systems

At different stages of the production cycle, there are different databases which exist for different business purposes. The rancher will typically maintain his own database, a stockman will have an inventory system, a feedlot will have a management database, and a packer will have its own inventory and management system. There is also a trend toward larger marketing alliance or national databases that include some data from each of these industry segments.

U.S. Pat. No. 5,322,034, which issued Jun. 21, 1994 to Richard L. Willham, for a "Livestock record system" describes a method for storing the individual animal's identification and performance data on a programmable electronic identification and data storage module carried with the animal. An object of the present invention is to provide a low-cost per animal system for obtaining and maintaining source verification and performance databases that are independent of the animal.

U.S. Pat. No. 5,315,505 issued to William C. Pratt on May 24, 1994 for a "Method and system for providing animal health histories and tracking inventory of drugs" describes a method and system for providing improved drug treatment to selected animals in a retained group. A computer system is used to provide an operator with the health and drug treatment history of an animal. With this information and a diagnosis of the animal's health condition, a drug treatment is chosen. The diagnosis and treatment are entered into the computer system to update the animal's health and treatment history. An object of the present invention is to provide complete source verification and performance databases for all key livestock events.

U.S. Pat. No. 5,673,647 for a "Cattle management method and system", issued on Oct. 7, 1997 to William C. Pratt, describes an automated method and system for providing individual animal electronic identification, measurement and value based management of cattle in a large cattle feedlot. That method includes individual animal identification, a computer system, and multiple measurements coupled with a cattle handling and sorting system. An object of the Pratt patent was to build a feedlot data base to more accurately identify and measure characteristics such as weight, so that subsequent animals could be produced and fed for more effective value-based selection and management of the animals. In particular, that database related to calculations for economic management of feeding and shipping to permit optimum weight gains and feedlot ship dates. Whereas the feedlot patent disclosed identifying a particular animal on arrival at the feedlot, an object of the present invention is to track individual animals throughout the production cycle and to maintain performance and source verification data in the least disruptive manner to existing databases and management systems.

SUMMARY OF INVENTION

An object of the present invention is to provide an effective data collection and database management methodology in the livestock industry including automated entry for individual animal identification; automated entry events and of default values for events and data in the processing cycle; and effective communication and sharing of data between the various databases. One result of this data collection and management invention is that quality assurance source verification data for individual animals will be available throughout the production cycle. This source verification will include the ability to implement HACCP plans. The source verification provides an opportunity for enhanced product value through improved quality assurance and food safety.

Another result of this data collection and management invention is that animal-specific performance information can be provided to the producer, the stockman, and the feedlot, and the packer so that those entities can make informed herd management and operational decisions. Improved information availability permits all segments of the livestock industry to reduce their cost of operations while improving product quality. The opportunities for process improvement range from avoiding duplicate treatments; to selecting more cost effective breeding stock; to selecting more cost effective feeds.

The data collection and management capability is provided in a seamless and non-intrusive manner to all participants. The system encourages the collection and storage of data by putting the majority of the data collection and management process in the background, transparent to the user. Features of the present invention include automated data entry with useful default capabilities for common processing situations, feedback to confirm receipt of data, and the effective integration of multiple databases and inventory or management systems. As part of the production process, other entities, which are not usually in the chain of title to an animal, also have an interest in a portion of the data. Veterinarians can access the health history, nutritionists can access the feed and health history, and bankers can know the location of their collateral. An object of the present invention is to employ authorization levels to designate what information may be made available to these entities.

Through the current invention, the complete history of an animal is now equally available throughout the production cycle, both source verification and specific performance information are accessible without unnecessary duplication of data.

Although the invention is described in the context of beef cattle, it is not so limited. It should be apparent to those skilled in the art that the invention can be modified, without departing from its principles, for other livestock including cattle, swine, sheep, goats, and fowl.

In accordance with the preferred embodiment of the present invention, a method and apparatus for a livestock data collection and management system is described. The objectives of the present invention are to provide an efficient and cost-effective system and method of livestock data collection and data management that will provide quality assurance, HACCP compliance, and source verification data for individual animals throughout the production cycle. The resulting information will provide a basis for the producer, the stockman, the feedlot, and the packer to make informed herd management and operational decisions. Components of the data collection and management system in the preferred embodiment include unique Radio Frequency Identification (RFID) transponders for each animal; a RFID Reader that can identify the animal transponders; a data concentrator which collects information from multiple measurement equipment or output devices; RF event action tags to automate data entry, preset event data default capability, and data transfer between databases to eliminate duplicate data entry.

DESCRIPTION OF FIGURES

These and other features, aspects, and advantages of the present invention will become better understood with regard to the following description, appended claims, and accompanying drawings where:

DETAILED DESCRIPTION OF THE INVENTION

EXAMPLE

Wireless Communication and Data Consolidation

In order to better understand the invention, key portions of the invention are described as examples, and larger examples are used to show how the pieces are integrated in the invention.

Figure 5:
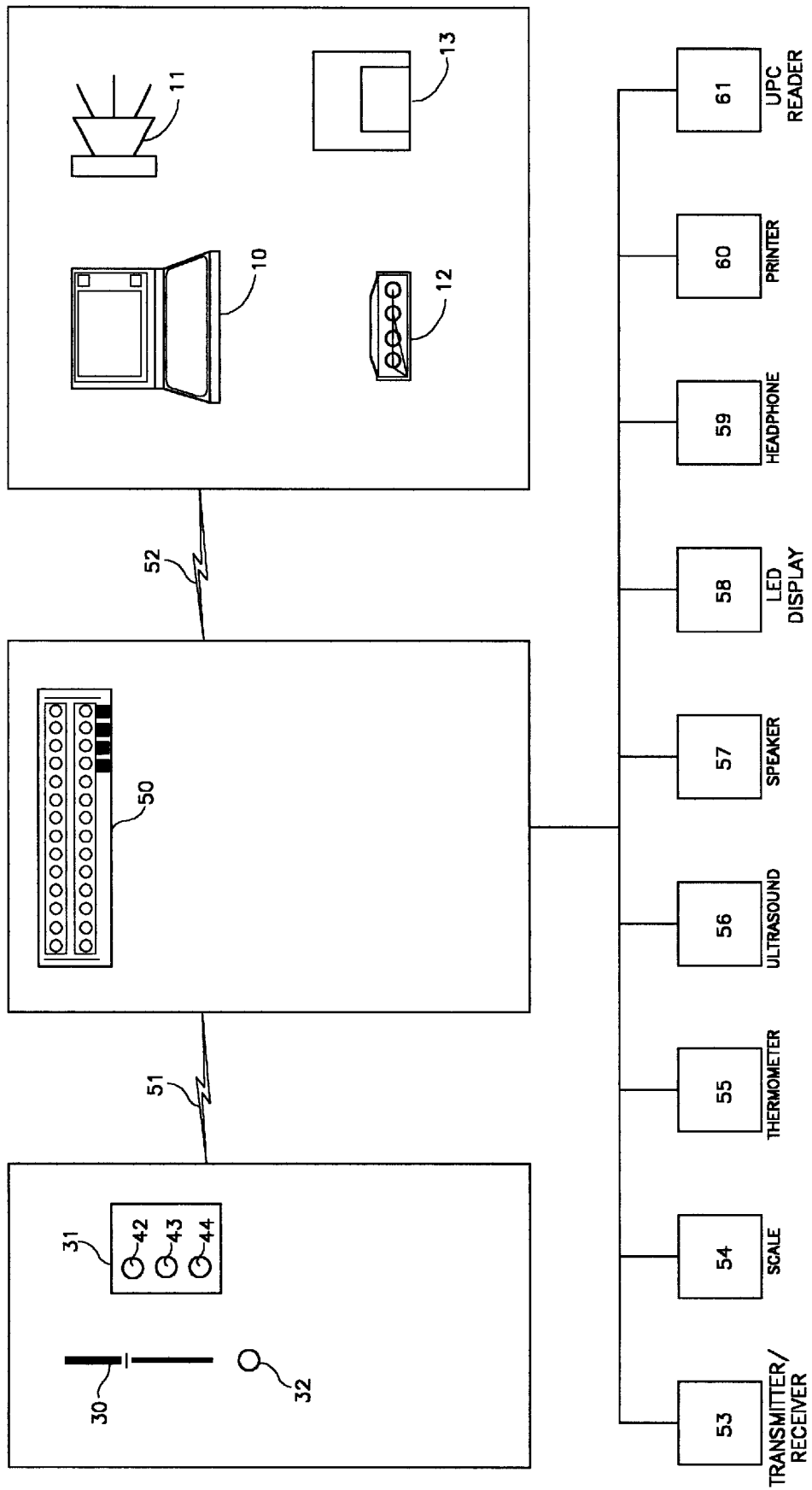
FIG. 5 is a schematic showing a wireless radio frequency data communication (RFDC) connection to a multiple input/output data concentrator device located between the RFID reader and a host computer.

Referring now to FIG. 5, an animal is uniquely identified by means of a radio frequency identification (RFID) ear tag 32 or other type of transponder. The preferred identification is an RFID ear tag such as those provided by Destron/Fearing, Inc., Allflex USA, Inc, Avid Marketing, Inc. Alternately, the identification may be by means of an RFID implant, a rumen bolus, or a collar fitting on a neck or leg.

This RFID identification is typically applied to young animals at the first opportunity to pen and work the animals, such as at an initial immunization. The RFID identification, typically will have previously been applied to older breeding animals, and will typically remain with the animal until slaughter.

As the animal is typically restrained in a working chute, its identification may be determined by means of an RFID reader 30. This identification is accomplished by placing the reader near, typically within six inches, of an RFID ear tag or implant transponder. The rumen bolus has a greater range. The preferred reader is described in more detail in an alternative embodiment described below.

Typical events performed on the animal may also be captured without keyboard entry by means of a Work Card 31 which is a collection of common tasks or events that are assigned unique RFID transponder codes, indicated as transponders 42, 43 and 44, such that the reader can designate an event by reading the transponder associated with an event. This reading is accomplished by placing the reader near the transponder. Alternately, the event transponders can be placed separately at convenient locations in the work area. The event transponders will typically be labeled with text or symbols to identify the event.

A data concentrator unit 50, which is typically a commercially available, multiple serial port, input/output device is used to collect the reader signal. The reader communicates by means of radio frequency data communications (RFDC) to a radio frequency receiver/transmitter that is connected by serial port 53 to the data concentrator unit. The reader may be connected by direct cable linkage to the port, or preferably, will communicate by radio frequency data communications means 51 from a transmitter/receiver located on the reader to a transmitter/receiver connected to port 53.

The data concentrator may also collect other livestock measurement data through serial port connections such as a scale 54, a thermometer 55, or an ultrasound measurement device 56. The data concentrator may also be connected to various output devices such as a speaker 57, an LED display 58, a headphone 59, a printer 60, or a UPC Barcode printer or reader 61.

The data concentrator communicates to a computer 10. The preferred communication is a radio frequency link 52 between a transmitter/receiver attached to the data concentrator and a transmitter/receiver attached to an interface board in the computer. The computer may include a keyboard, a monitor, and a speaker 11. Data may be stored to a diskette 13, but will typically be transferred by means of a modem. The computer is preferably an IBM compatible laptop or desktop computer. Beeflink™ software runs on the computer to provide the livestock data entry management function. The computer is connected by means of modem 12 to other computers as described more fully in other example embodiments.

This embodiment permits a portable reader to be used in a remote location to gather animal and event data and to communicate that data to a host computer.

EXAMPLE
Radio Frequency Identification Reader

Figure 6:
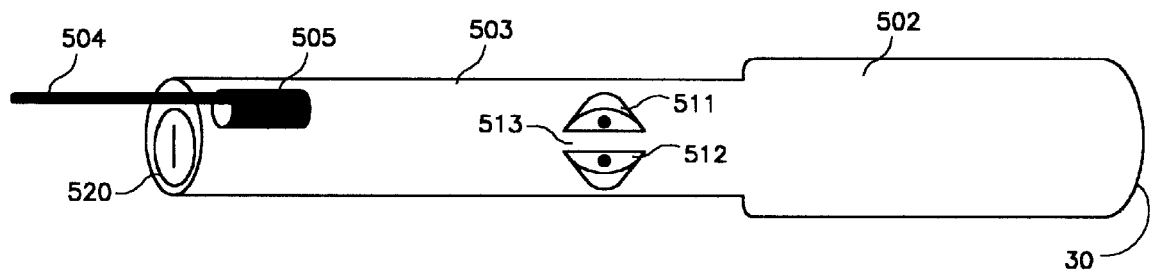
FIG. 6 is a side view of an RFID/RFDC handheld reader.

FIG. 6 is a side view of a reading device that is generally referred to as a flashlight reader because the unit is held as a large flashlight would be held. The preferred method of reading animal RFID transponders is with a portable reader such as this device. The reader has an approximate length of eighteen inches so that it can be held by hand outside of a working chute, and the reader may then extend into the chute to reach approximately 5–6 inches from the animal's ear tag or implant. The reader consists of a generally slightly elliptical body 30, constructed of a rugged material such as polycarbonate. The body has a handle section 503 of diameter of approximately 1.5 to 1.8 inches for the convenient holding of the reader by hand. A relatively larger section 502 is provided in order to house electronic components for the RFID function.

A battery compartment is accessed through a battery door 520 that is sealed by a gasket. The battery is heavy relative to the other components, so the center of gravity of the unit is near the handle section.

The preferred method of communicating with the reader is through radio frequency data communications (RFDC) such as the 11.0592 MHz crystal board manufactured by RF Monolithics, Inc. An antenna extension 504 is connected to the reader body by means of an antenna connector 505 that is recessed into the reader body. The housing is sealed to minimize damage due to moisture.

In an alternative embodiment to the RFDC communications, the reader can be tethered with a cable and an RS232 interface directly to a computer or external device.

Although a mechanical or other type of switch may be employed, the preferred method of operating the device is an infrared activation switch, which consists of an infrared light source 511 and an infrared reader 512 which will form a light circuit that can be broken by placing a thumb or a mechanical object in the space 513 between the light source and the reader. The mechanical object is desirable in some circumstances to leave the reader in an activated state while it is extended further into a working chute.

A holster is typically provided to hold the reader when it is not in use.

Figure 7:
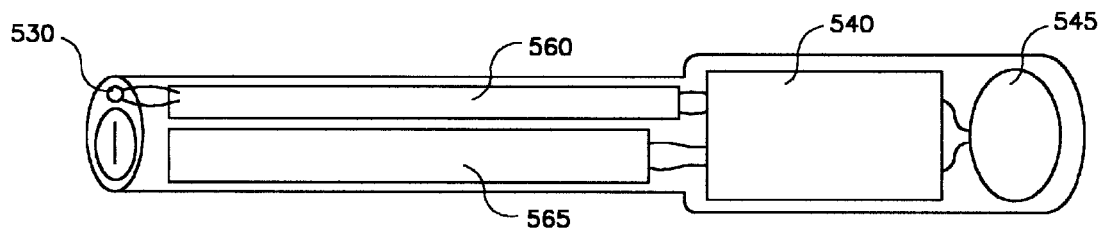
FIG. 7 internal schematic of an RFID/RFDC handheld reader.

Referring to FIG. 7 which is a cross sectional view of the reading device described above, the reader consists of a rechargeable battery 565, RFID electronic circuitry 540, an RFID antenna 545, RFDC Data Communications electronic circuitry 560, and a status light 530. The rechargeable battery is preferably a commercially available battery pack such as that used in portable power tools. The RFID electronic circuitry is available from vendors such as Avid Marketing, Inc., Destron/Fearing, Inc., and All-Flex USA, Inc. The RFID antenna is preferably a single wound coil. The antenna, when it is brought within a range that is typically 5 to 6 inches from the transponder in the case of RFID ear tags or implants, is able to detect the RFID signal from those devices. The RFID circuitry interprets the signal and communicates the results to the RFDC circuitry, which communicates that result by means of radio frequency broadcast with a typical range of up to 800 feet. Greater distances can be accomplished by substituting other commercially available RFDC circuitry. The status light 530 is preferably a 3-stage LED display that will show one color to indicate that the power is in the ON state, a second color to indicate that an RFID signal has been detected, and a third color to indicate that the RFID signal has been confirmed by the host computer.

Figure 8:
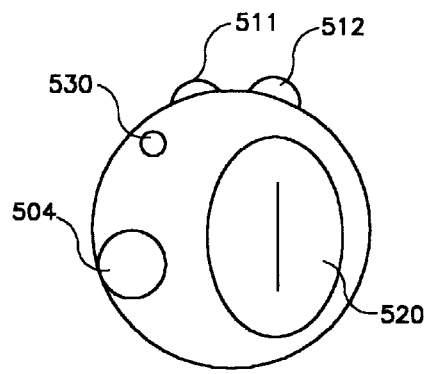
FIG. 8 is an end view of an RFID/RFDC handheld reader.

Referring to FIG. 8, which is the handle end view of the reader, the RFDC antenna 504 extends toward the user, and the status light 530 is located such that the user can observe the light while operating the reader. The thumb switch is defined by the infrared components 511 and 512 that are typically located at the top of the unit.

EXAMPLE
The Beeflink™ Data Collection and Management System

BeefLink is a data cattle collection and data management implementation of the current invention. The Beeflink system is easily adaptable to other livestock species, with the major change being the definition of industry-specific default events.

BeefLink is comprised of hardware and software to permit the user to scan radio frequency identification (RFID) ear tabs, implants collars, or boli with radio frequency identification scan readers; to enter new animals; to look up information on existing animals; to input new events; and to run queries on the work done. One objective of the software is to display pertinent data on each animal and add new events to the record in the least intrusive manner. The new animal records and events recorded are uploaded and incorporated into a larger database. Communication with the larger database allows the user to receive downstream animal performance data at his own computer.

The minimum components necessary to operate the system are as follows: a host computer which is an IBM-compatible desktop or laptop computer with Windows™95 (or higher) operating system; 50 MHz 486 processor; 8 MB RAM; one serial port; 300 MB hard drive; 14.4 Kbps modem; 3.5" Floppy disk drive; external power supply; MS-Access™97 database software; BeefLink™ data collection software; Hand-held RFID reader with an RS-232 output capability; a null modem cable (DB9F to DB9M) up to 50 feet between laptop and reader; and RFID transponders on each animal.

The preferred components of the system are as follows: a host computer which is an IBM-compatible desktop or laptop computer with Windows™95 (or higher) operating system; 133 MHz Pentium processor or higher; 32 MB RAM; one serial port; 1 GB hard drive or higher; 28.8 Kbps modem; 3.5" Floppy disk drive; CD-ROM drive; Sound card and driver; external speakers; external power supply with DC connection; PC-Anywhere™ remote access software; MS-Access™97 database software; BeefLink™ data collection software; Hand-held RFID/RFDC reader with an LED indicator to confirm data receipt by computer; external RFDC transceiver at computer for communication to/from reader; Data Concentrator with external multiple serial ports; RFID transponders on each animal; and an RFID Work Card with action tags.

Figure 10:
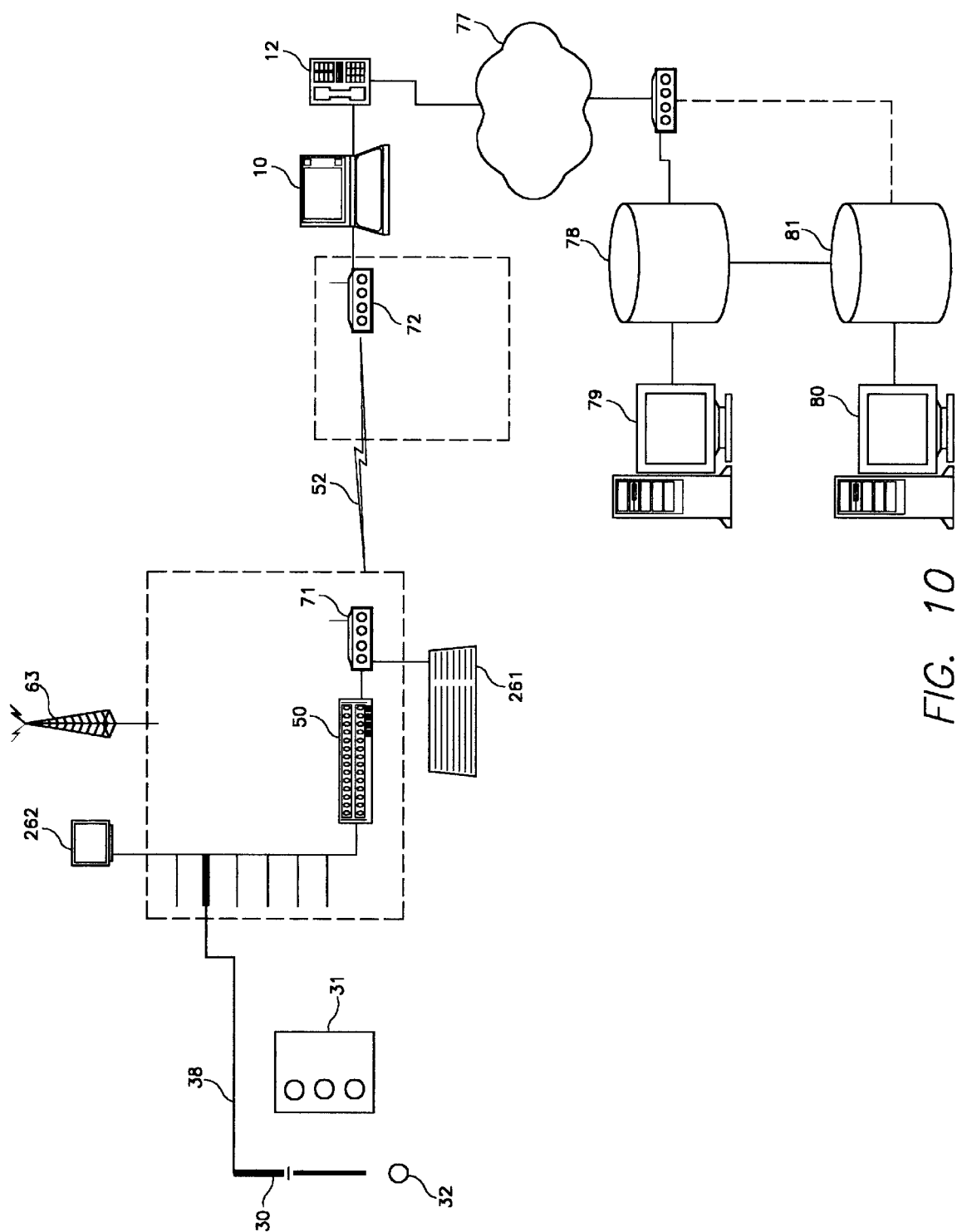
FIG. 10 is a schematic showing a cabled connection between the RFID reader and a data concentrator device and a wireless connection to a host computer and additional livestock databases.

Referring to FIG. 10 which is a schematic of one embodiment of a data collection system, the Beeflink software runs on the host computer 10 which may be either laptop or desktop computer. The computer is in contact, by means of wireless radio frequency communications 52, with a multiple input/output device or data consolidator 50. The wireless connection is accomplished by means of a transmitter/receiver 71 connected to the host computer, and a transmitter/receiver 72 connected to the data consolidator by means of a serial port. In cases where the data consolidator may be located at relatively large distances from the host computer, it may be necessary to use a larger RFDC antenna 63. In some cases, it may be desirable to connect a keyboard 261 and monitor 262 to the data consolidator.

In the embodiment shown, the reader 30 is connected to a port on the data consolidator through a cable 38 and a serial port 53. In alternate embodiments, the reader is connected to the data consolidator by wireless radio frequency data communication. The reader may read an animal RFID transponder 32 and a Work Card 31, which consists of multiple event RFID transponders. The host computer 10 is connected to the Internet 77 by means of a modem 12.

Other computers 79 and 80 containing other databases 78 and 81 may be connected to the Internet by means of a modem 76, such that data may be transferred over the Internet between the host computer and the other computers. Other embodiments illustrate the use of the Beeflink software on both simpler and more complex data gathering systems.

Double-clicking the BeefLink icon on the Windows 95 Desktop display starts the BeefLink program. When the Company ID, the User ID, and the Password are entered on the Authorization Screen display, the program can be accessed.

Once authorization has been verified, a Command Center display permits graphical user interface navigation to the Data Collection Center, the Communications Center, the Report Center, or Housekeeping. The Housekeeping functions include Setup User Security, Password setup, and Program Defaults configuration such as units of measure, choice of language, and date formats.

The Data Collection Center permits equipment setup so that the BeefLink system can receive data from multiple devices or output data to multiple devices.

The RFID reader typically communicates either wirelessly or through a cable to the "Comm 1" serial port on the data concentrator unit. In some cases, the reader will be the only equipment used, and no equipment setup will be required. In some simpler applications, a data concentrator unit may not be used, and the reader may be connected directly to a computer port, or communicate in a wireless fashion to a radio receiver/transmitter which is connected directly to a computer port.

If equipment in addition to the RFID reader is used, it will be connected through a serial port on the Data Concentrator unit. The Data Concentrator unit has multiple serial ports, each of which is default labeled for specific types of equipment which is commonly used in the beef industry. The user simply plugs each device into the proper port on the Data Concentrator unit.

The default devices and communications ports include:
CommPort 1 RFID Device
CommPort 2 Scale for weight measurement
CommPort 3 Digital Thermometer for temperature measurement
CommPort 4 Ultrasound for backfat measurement
CommPort 5 Barcode for treatment identification
CommPort 6 Printer for output The RFID reader is always connected to port 1, and is used to read both animal ID tags and event tags. Its configuration cannot be changed. Port 2 is connected to an electronic weigh scale and is used to collect animal weights. Port 3 is configured for a digital thermometer and is used to collect body temperatures. Port 4 is connected to ultrasound equipment used to measure back fat. Port 5 is connected to a bar code scanner and is used for collecting the identity of drugs used as treatments. Port 6 is connected to a remote printer that prints labels for veterinary samples that are being collected.

The user may connect equipment other than the devices on the standard list by editing, in the Beeflink software, the information for Ports 2 through 6, or by adding information for a new port.

In order to speed data entry, Action Tags are used to enter most events. Rather than typing in events at the computer keyboard, events are assigned to the Action Tags ahead of time so that the tags are simply scanned with the same reader used to scan animals in order to enter events or update fields in an animal's record. For instance, if cows are being checked for pregnancy, An Action Tag will be assigned beforehand for both the "pregnant" and "open" result so that the user can scan the cow and the appropriate pregnancy Action Tag when the result is known. Another example is that certain animals being processed are vaccinated for shipping fever. An Action Tag is assigned to the shipping fever vaccination event so that when animals get the vaccine, the user can scan the animal and the shipping fever Action Tag in order to record the event.

The Action Tags are typically affixed to a Work Card alongside their corresponding event labels. The Work Card can be placed in strategic locations such as on the side of a working chute or with the vaccine or treatment bottle to which they are assigned.

Most common events will identified with Action Tags when the user receives the system. The user may, however, add to or change existing events through the Event Setup form in the Setup section of the Data Collection screen.

Each event has one or more default details associated with it. For instance, the event "LOCATION" might have three different details such as PEN-1, PEN-2, and NORTH 4000, that can be used to record changes in animals' locations.

To add or change an Action Tag associated with an event, the user first connects the RFID reader to Comm 1 of his Data Concentrator unit. The user then scans the Action Tag, and the unique transponder number of the tag will appear in the first text box of the setup screen. The user can then select or type the new assigned event. The same procedure can be repeated for as many Action Tags as desired to link to new events and details.

A default list of all of the events are shown below. It is desirable to use these default events when appropriate because they update fields in the database. If none of the default events apply, the user may key in a new event.

Event List:
1 Abort
2 Assess Animal
3 Assess Animal-Health
4 Assess Animal-Sick
5 Assign Value
6 Birth
7 Birth-Est
8 Brand
9 Bred-Al
10 Bred-Bull-Grp
11 Bred-Bull-Ind
12 Breed
13 Buller
14 BullOut
15 Calving
16 Carcass
17 Carcass Weight
18 Clock-In
19 Clock-Out
20 Clone
21 Colot
22 DamID
23 Ciagnose
24 Died
25 Dry Conversion Rate
26 Feed
27 Feedlot In
28 Feedlot Out
29 Feed-ration-Start
30 Finance
31 Group
32 HACCP
33 Hedge
34 Hedge-Remove
35 Implant
36 Implant-Remove
37 Incident
38 Incident-Removed
39 Insure
40 Irradiate
41 Location
42 Metal Tag
43 Origin
44 Packer-In
45 Packer-Out
46 PregChk
47 Production_Destination
48 Purchase
49 Railer
50 RegNum
51 Retag
52 Retailer_Feedback
53 Roundup
54 Sell
55 Set Alliance
56 Sex
57 SireID
58 Slaughter_Date
59 Spay
60 Stocker-In
61 Stocker-Out
62 Synchronize
63 Tag Brand
64 Trailer
65 Transfer
66 Treat
67 Vaccinate
68 Visual Color
69 Visual ID
70 Wean
71 Weather
72 Weigh
73 Weigh-Average
74 Wt-Birth
75 Wt-Birth-Est
76 Wt Est
77 Wt Feedin
78 Wt-Feedout
79 Wt-Packerin
80 Wt-Packerout
81 Wt-Purchase
82 Wt-Sell
83 Wt-StockerIn
84 Wt-Stocker Out
85 Wt Wean The most efficient way to record repetitive events that occur to multiple animals is to assign animals to logical groups and to record the events to all animals in the group.

For example, if all animals in group 1 (GRP-1) are moved from Pen 50 to Pen 65 without processing the animals through a chute, the user may click on the "Assign Group Events" button at the Data Collection Center to open the Group Event entry and then click on the Group drop-down menu and select "GRP-1". The user would then click on the Event drop-down menu and select "Location" and then click on the Detail drop-down or key in "Pen-65". The user would then click the "Add" button at the bottom of the form and the event will display in the grid in the middle of the form. The user may click the "Update Record" button to add the event to all animals in GRP-1.

The form also allows for entering multiple events and details before updating the group. For instance, if every animal in a group had a change in their ration and received a group treatment in their feed, the user could select and "Add" both events, and then update the records.

When all animals being processed receive the same treatments, but don't belong to a particular group, the default event option should be used. This feature permits the user to preselect events for all animals. Then, as the animals are scanned, each animal's record is updated with the default events and details, until the function is turned off.

For example, a stockman operation is receiving 50 new calves from a ranch, and the stockman needs to record the origin of each animal, the vaccines given each animal, the identity of the group, and the location where the animals will be going. As each event and detail is selected, it is added to the Default Event Form by clicking on the "Add" button. With the default feature turned on, each animal scanned will have it's Origin recorded as "SMITH RANCH", receive a vaccine event called "SHIPPING FEVER", be placed in a group called "NEW", and have the location "NORTH PASTURE" saved to its record.

Any time that different events need to be recorded on each animal, the events must be applied individually. For example, if cows are being checked for pregnancy, the results vary and need to be recorded individually. Another example is when sick animals are treated at a feedlot—different treatments are applied and recorded individually. Recording individual events is automated by using the Work Card described earlier. After an animal is scanned, the events on the card that apply are scanned and thus recorded. This method can be used in conjunction with default events—all animals receive the default events and some also receive additional individual events.

If animals are receiving new sequential visual and/or metal ear tags, they can be sequenced automatically so that the tags increment as each animal is scanned. To set the starting sequence for new tags, the user can click on the "Sequence New Ear Tags" button at the Command Center and enter a tag prefix or Starting Tag Number.

Once the starting ear tag sequences have been set, they are ready to use when the user needs them. The user may activate sequencing as a default event or with an Action Tag.

Before working cattle, the user may either verify or make changes to his Work Card through the "Verify Work Card" button in the Prepare to Work section of the Data Collection form. In order to verify that an Action Tag is actually associated with the correct event, the user will scan the Action Tag. If the tag has been assigned as an event, the user will get a duplicate error-trapping message. By the "OK" button on the error message, or pressing the Enter key, the screen will display the event currently associated with the Action Tag.

If the event associated with the Action Tag is correct, then the user can continue scanning other Action Tags that need to be verified. If the user needs to change the event associated with the tag, the user erases the current entry and enter a new event and detail for the deleted Action Tag.

When the user is ready to work animals, which will usually be done at the working chute, the user can click the "Start" of the screen. Before the user can begin, he must intentionally turn the default events either on or off by clicking the appropriate radio button. The program won't let the user do anything until one of the buttons is clicked. This way, the user won't set up defaults and forget to turn them on, or assign default events by mistake.

With the RFID reader cabled or wireless radio cabled to Comm 1, the user is ready to start scanning animals.

For example, if the first animal scanned has existing records in the system, the display screen will show those data fields. The scroll bar may be used to view additional fields. The bottom half of the screen shows all events recorded during the animal's lifetime. If the user scans a "TREAT" Action Tag with "IVOMEC" for the detail and changes the animal's location to Pen 50, the records will be updated.

Although the user may watch the results of his scans on the screen, it's not necessary to see the screen while processing animals. A feedback acknowledgement in the form of a light or sound may be sent to the user to indicate that the scans have gone through correctly. This feedback can be in the form of a light or sound generation by the Data Concentrator unit, or it may be directed through a serial port to an external device. Typically the user will get a positive feedback signal in the form of a burst of light and an audio acknowledgement when he reads an animal that exists. The user will also get the acknowledgement when he scans an event.

When a new animal is scanned, the system cannot recognize the RFID transponder scanned so the user is signaled to re-scan the animal to verify that it was read. Upon receiving the verified scan, the system enters the new animal into the database. The new animal has only one piece of data so far—its RFID transponder number. Other data is entered in the normal method, either individually or as defaults.

If all of the animals being worked are new to the system, some defaults will probably be entered into the system. For instance, if all animals have the same estimated birth date, the date can be set as a default and added automatically to the birth date field of each new animal scanned. The same default function could be used for origin, location, or group.

If, however, the animals have varying birth dates or birth years, the available birth dates can be assigned to Action Tags, using the event setup form. The user can use BIRTHDATE as the event and the date as the detail. As each animal is scanned, the correct birth date tag is scanned and assigned to the animal.

If actual birth dates are used and there are many possible entries, the user will enter the dates individually. The user will Set up an Action Tag event with BIRTHDATE as the event and KEY as the detail. To add a specific birth date to the animal's record, the user will scan the animal and the Action Tag. The user is then prompted to key in the birth date.

Entering non-sequential visible or metal tags may be done in the same manner.

If an animal loses its RFID tag the animal can be re-tagged, and an Action Tag with "RETAG" as the event can be used to replace the old tag references. The system can be used with visual ID tags and barcode tags, but RFID transponder ear tags are the preferred identification method.

Animal body weights can be entered in several ways. First of all, there are many different types of weights that can be recorded. Periodic weights are the most common, but other specific weights such as weaning weight, stocker-in weight, feedlot-in weight, etc. can be specifically noted.

Weights can either be recorded automatically with an electronic scale, or keyed in using a keyboard or other peripheral method. If the weights are to be gathered automatically, the user should identify the port through which the weights will be entering. The user will select the appropriate weight event and select the detail, either AUTO for a scale connected to the system, or KEY if weights will be keyed in. If the event is a default to be collected on all animals on a connected scale, the weights will be collected automatically. If the default is the keyed weight, each time an animal is scanned, the user will enter a weight. If the user is not weighing all animals, the same events can be scanned as Action Tags.

In addition to setting default events at the computer, defaults can be assigned, turned on and turned off in the field such as at the working chute. For example, if the user has fifty animals being worked that receive the same events—the events can be identified and turned on while working the cattle. If the next group of animals being worked receive different defaults, then the current defaults can be appended or cleared and new ones assigned.

An Action Tag labeled "ADD DEFAULT EVENTS" is scanned prior to identifying which events will be defaults. Next, the event or events that the user desires to be defaults are each scanned. The user than scans all animals to which the defaults apply. If the defaults need to be cleared, the user scans the "RESET" tag to clear the field-assigned defaults. This will not change the defaults that have been turned on at the computer—they are turned on and off only at the computer in the "Set Default Events" screen.

If the user mistakenly assigns events to an animal and wishes to delete them, he can "scan the "Delete Events" tag. This will remove all events that have been assigned to the animal for the current date. Any events that are correct should be rescanned. This function also works well if the user is assigning default events to a majority of the animals, but wants to skip certain animals. The user can simply scan the Delete Event tag after the animal that does not receive the events is scanned.

To do a detailed review of an individual animal, the user can click the "Animal" button in the Review section of the Data Collection form. The animal record contains some basic header information, as well as an on-going list of events, weights, and animal movements. To review an individual animal, the user scans the transponder or types in the visual or metal ear tag number. The events listed on the animals record can be sorted in order of the events, the details, or by date. The user can also do a quick review of all recorded weights or locations by clicking the applicable radio button on the bottom of the form.

The information collected on all animals can be reviewed by clicking on the "Work Done" button in the Review section of the Data Collection Center. This form allows the user to query the data that has been collected by selecting the field and the criteria of the search.

Clicking the "Reports" button in the Command Center screen can access a multitude of local management reports. Reports that cover information on animals that have left the ranch or feedlot will be available from the regional or national database VIA the Internet.

Events recorded on each animal will typically be exported to a larger database. The larger database will not only store information on other animals, but will store information on one entity's animals that have been transferred to other entities. The user may click on the "Export" button at the Command Center to create the file for uploading to the larger database. The export file is in the form of an event file, with special entries for new animals added to the local database.

Many events can be identified by a single code and a single set of associated data. Other events such as an animal vaccination event require additional data. The user can read an event detail transponder, such as vaccine type, and can then read sub-detail events such as a dosage or batch that he wants appended to the main detail. This is accomplished by identifying each event detail as either a STANDARD or SUB detail. If the detail is a SUB event, then it will append to the last standard detail scanned. For instance, along with a vaccine, For instance, the user may want to add a dosage, a batch code, or a cost associated with the vaccine. The user can scan an event detail and then scan any sub-details, such as dose and batch, to append to the main detail. Each standard detail is identified as to whether it can have sub-details appended to it.

EXAMPLE

A Paper-Based Embodiment

Figure 1:
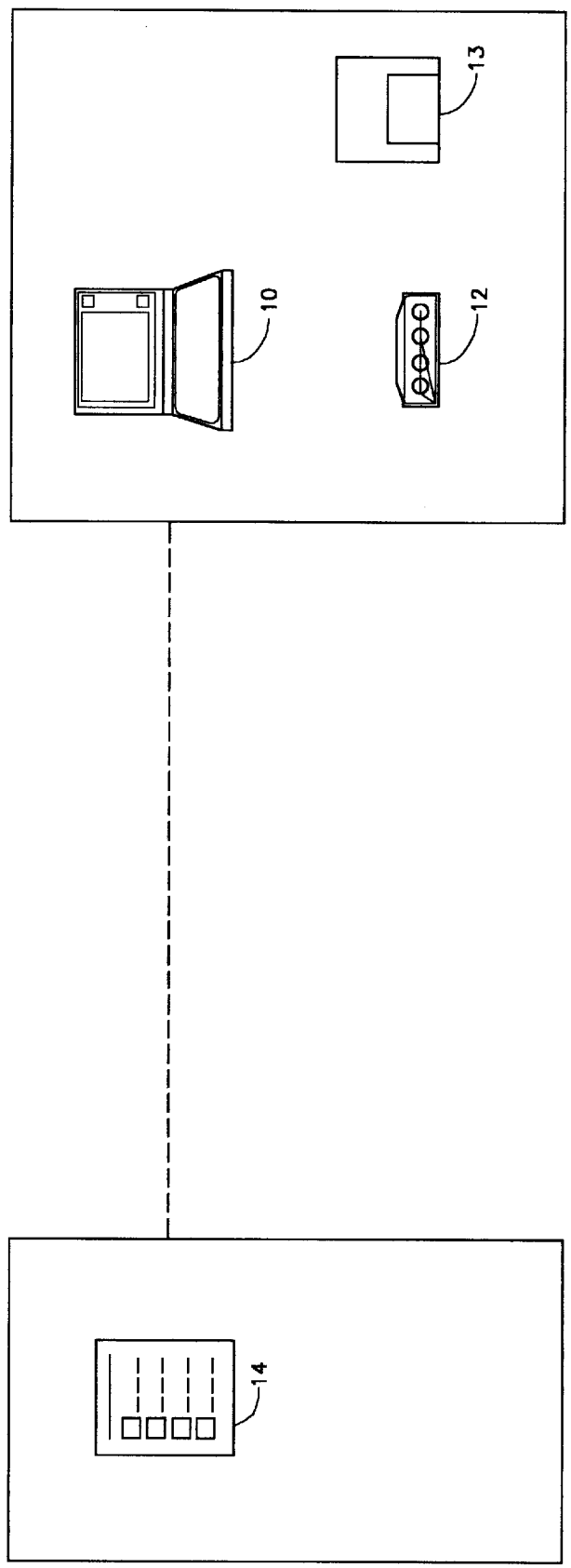
FIG. 1 is a schematic of a paper information entry embodiment of the information management system.

FIG. 1 illustrates a paper-based embodiment of the BeefLink data collection software. In this case, animal identification would be obtained from a visual tag, such as an ear tag, and that visual identification would be written on a paper log 14. All event data and measurement data would be recorded on the log sheet and then entered by keyboard into the BeefLink software running on the host computer 10. The modem 12 in this embodiment permits the host computer to establish data transfer capability with other computer, and the removable disk 13 provides a data backup capability.

Although the data entry would be cumbersome for large numbers of animals, this paper system may be more affordable for smaller producers.

The producer may elect to install only visual identification or to install a tag that is both visual and RFID.

If an RFID transponder was attached to an animal, the producer would be responsible for manually entering the code to the computer, so that the code would be correlated to the visual tag identification.

Alternately, it is possible to operate the BeefLink software on the basis of the visual identification, or preferably a longer, unique identification key assigned to the animal. In that event, an RFID device may be attached downstream, and the new RFID code would be assigned to the animal.

EXAMPLE

A Direct Reader Embodiment

Figure 3:
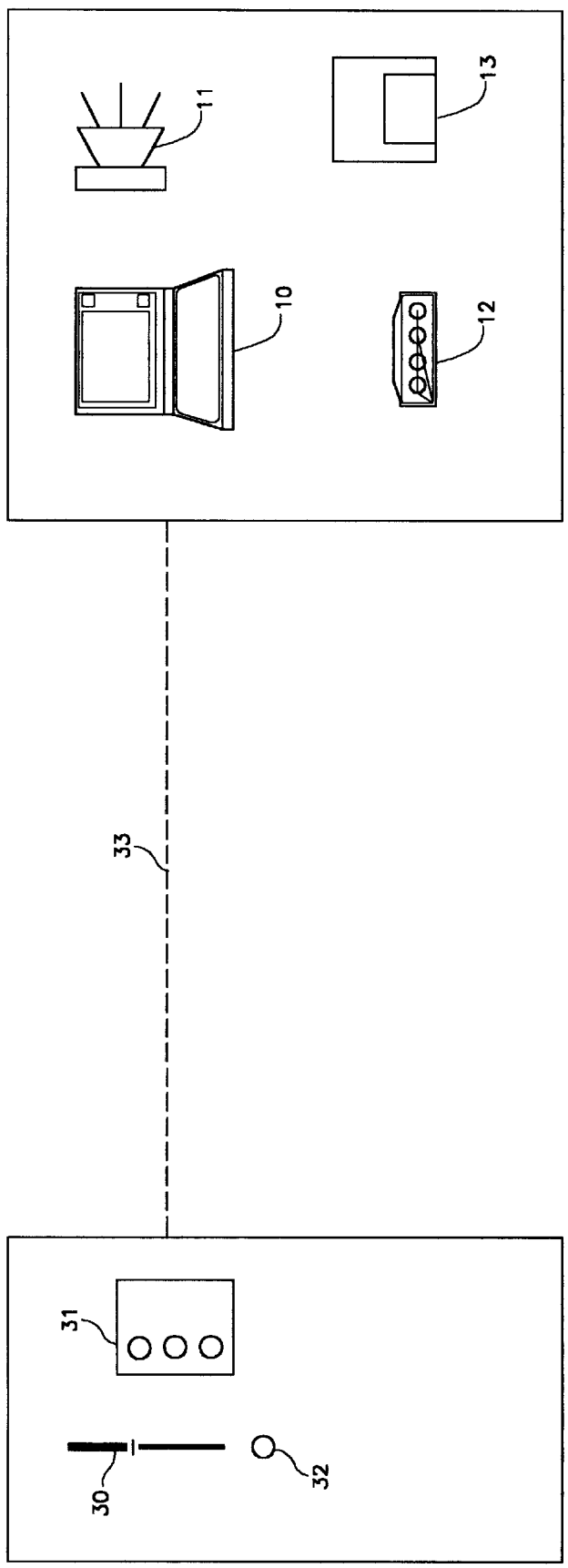
FIG. 3 is a schematic showing a wired connection between the RFID reader and a host computer.

FIG. 3 illustrates a simple embodiment of the BeefLink data collection software with an RFID reader 30, which was linked by cable 33 to a host computer 10. In this case, animal identification would be obtained from an RFID transponder 32, and Work Cards 31 where RFID event transponders are used to record events.

The speaker 11 provides a feedback means to confirm the receipt of animal and event data by the computer.

The modem 12 in this embodiment permits the host computer to establish data transfer capability with other computers, and the removable disk 13 provides a data backup capability.

This approach would typically be used by relatively small producers who could complete their livestock work sessions in a relatively short time, such as the battery life of a notebook computer. In this embodiment, measurement data might be ported directly to the computer 10 rather than a data consolidator.

EXAMPLE

Simple Wireless Reader Embodiment

Figure 4:
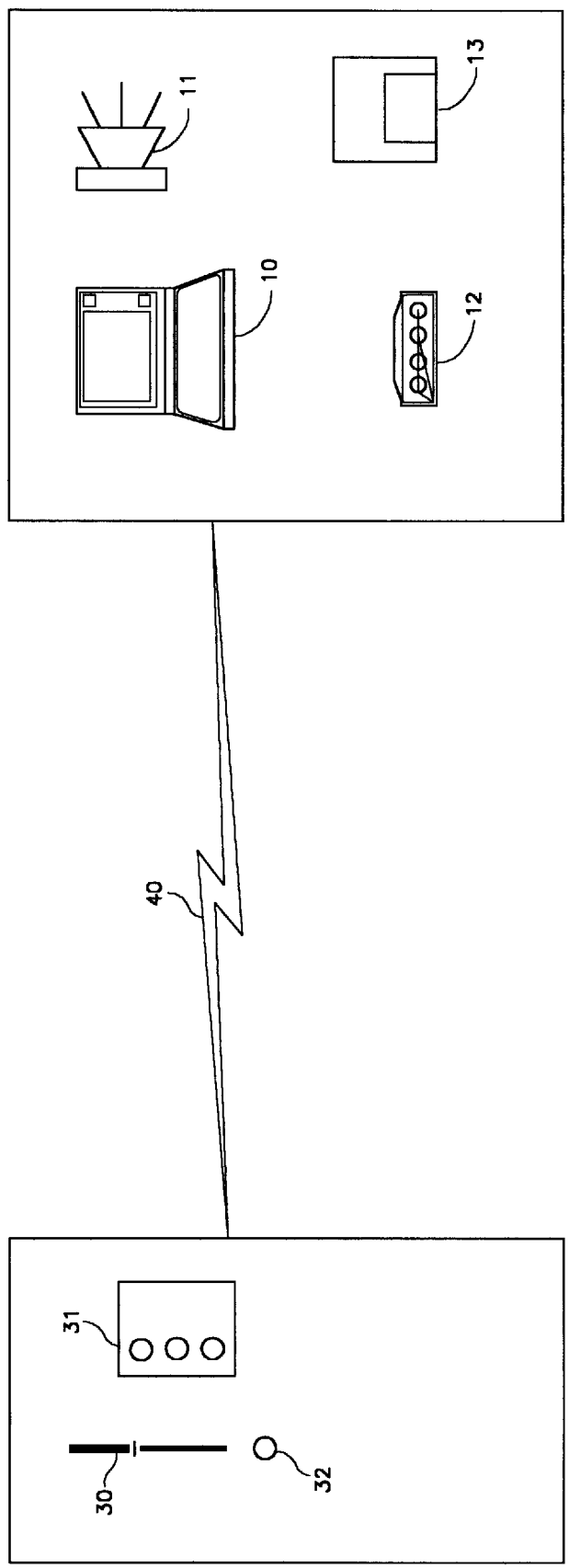
FIG. 4 is a schematic showing a wireless radio frequency data communication (RFDC) connection between the RFID reader and a host computer.

FIG. 4 illustrates a simple embodiment of the BeefLink data collection software with a radio frequency wireless connection 40 between the RFID reader 30 and the host computer 10. In this case, animal identification would be obtained from an RFID transponder 32, and Work Cards 31 with RFID event transponders are used to record events.

The speaker 11 provides a feedback means to confirm the receipt of animal and event data by the computer.

The modem 12 in this embodiment permits the host computer to establish data transfer capability with other computers, and the removable disk 13 provides a data backup capability.

EXAMPLE
Existing System Communication

Figure 2:
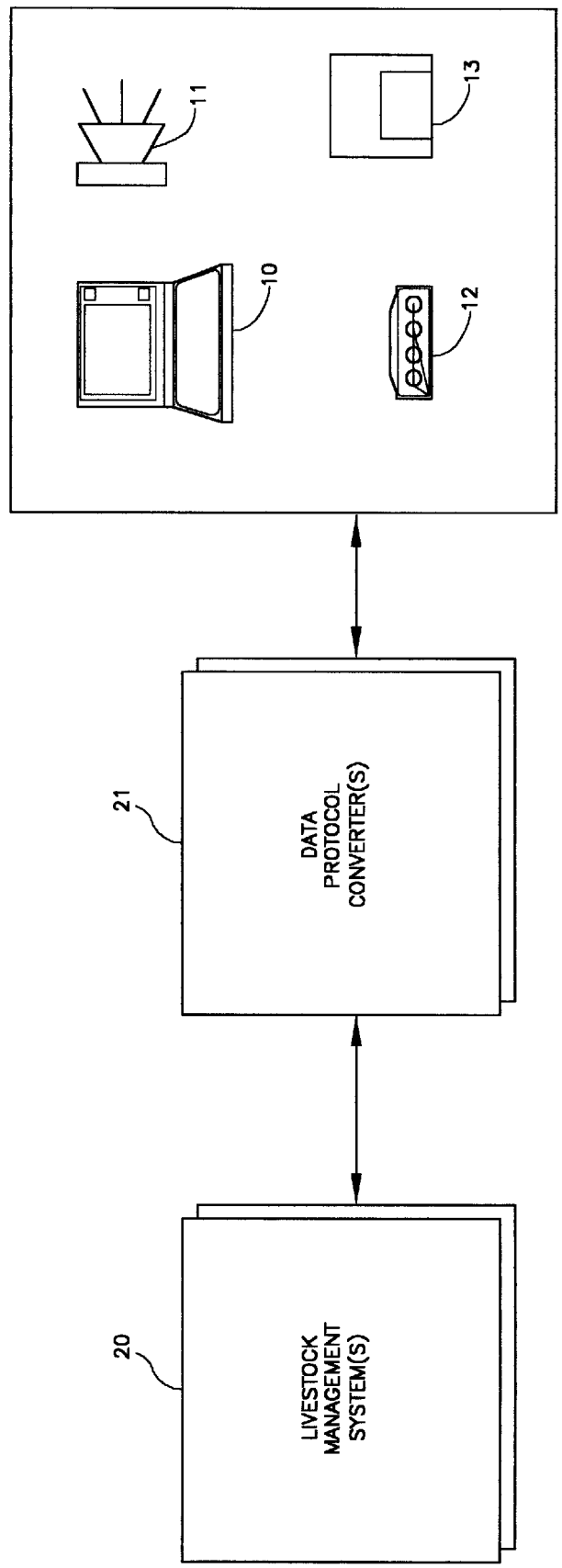
FIG. 2 is a schematic illustrating a protocol converter to exchange information with an existing livestock management software program.

FIG. 2 illustrates the ability of the BeefLink software running on a host computer 10 to accept data from an existing livestock management system 20 or to update the management system data with information from BeefLink. If the existing management system software was not running on the host computer, the host computer could establish a link to the existing management system computer by means of a modem 12 and either a direct link or an Internet connection. A data protocol converter 21, which may be resident on either computer, would coordinate the transfer of data to and from the BeefLink program to the management system software.

Figure 9:
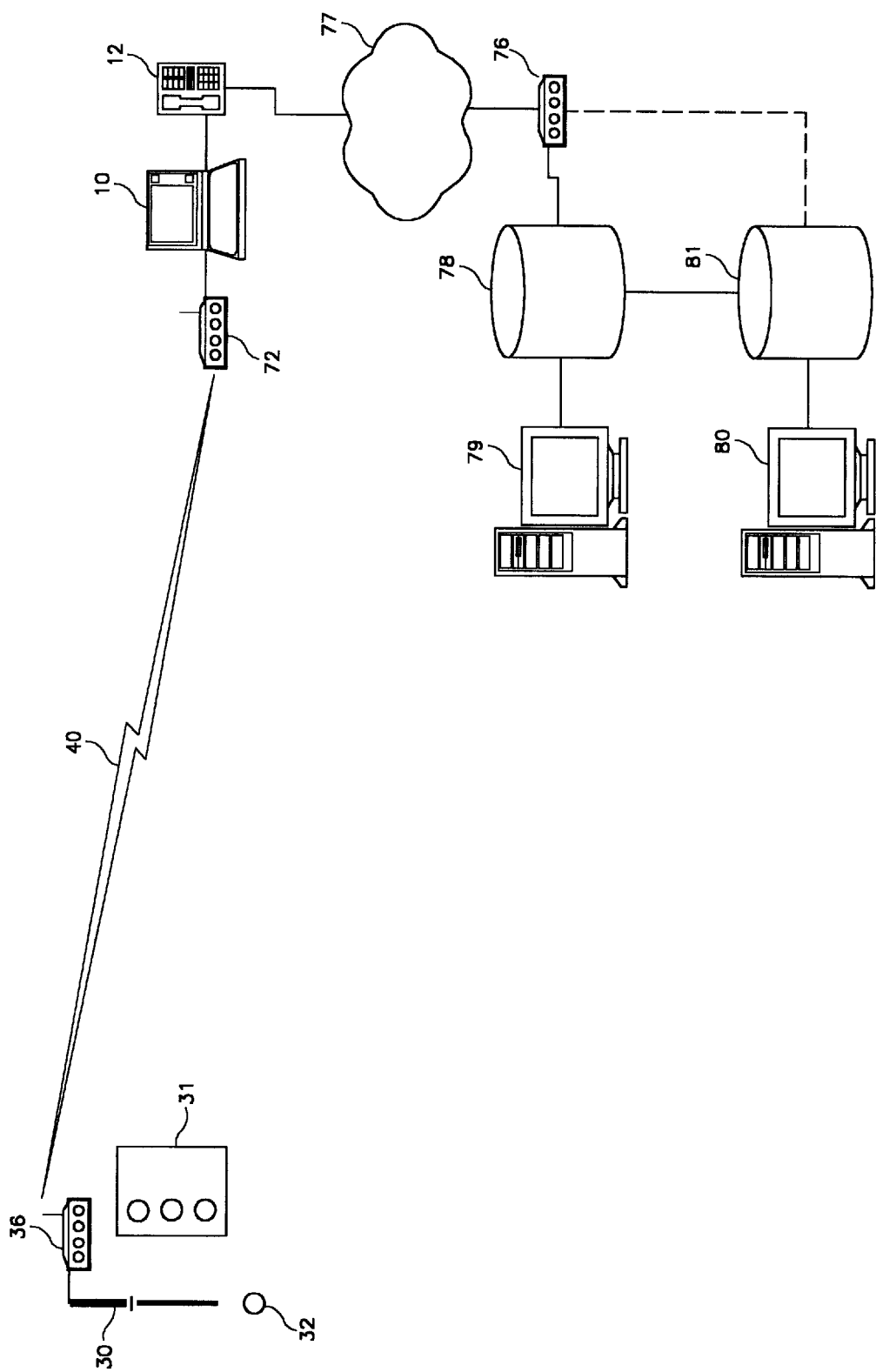
FIG. 9 is a schematic showing a wireless radio frequency data communication (RFDC) connection between the RFID reader and a host computer and additional livestock databases.

FIG. 9 illustrates this existing system or existing database communication in a wireless reader embodiment. The RFID reader 30 communicates through RFDC transmitter/receivers 36 and 71.

Existing or downstream database 78 or existing management system software running on a computer 79 may be accessed through the host computer modem 12 by either Internet transfer 77 or by direct modem connection between the computers.

EXAMPLE
Multiple Reader Locations

Figure 11:
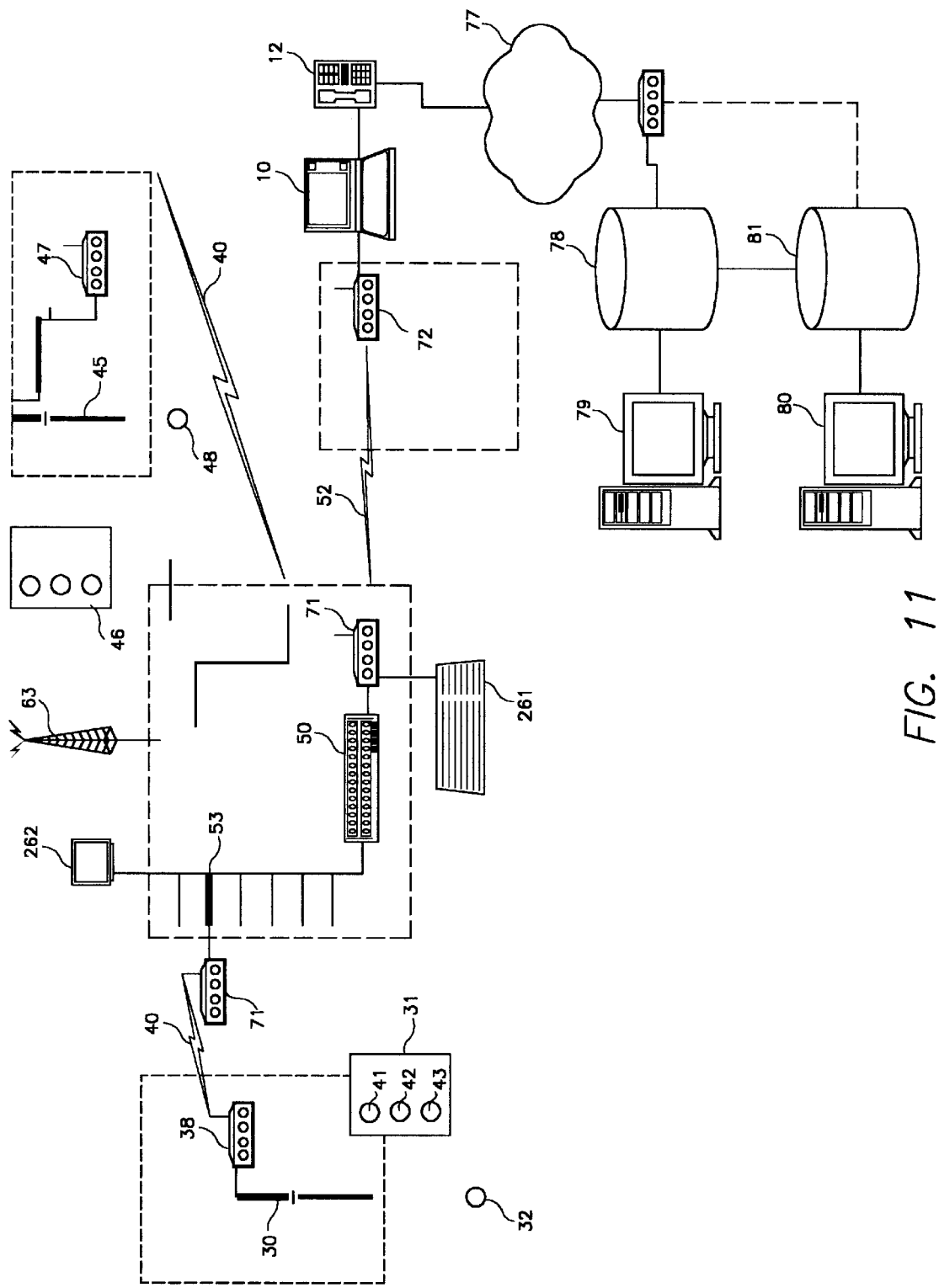
FIG. 11 is a schematic showing a wireless radio frequency data communication (RFDC) connection between multiple RFID readers and a data concentrator device and a wireless connection to a host computer and additional livestock databases.

FIG. 11 illustrates a wireless reader configuration where the data concentrator 50 receives data from multiple RFID readers indicated by readers 30 and 45. This type of configuration is desirable in larger operations where there may be more than one livestock working area at a given time. In this case, a larger antenna 63 may be necessary at the data concentrator, and it may be desirable to have a keyboard 261 and monitor 262 connected to the data concentrator.

EXAMPLE

Description of the Preferred Embodiment

Figure 12:
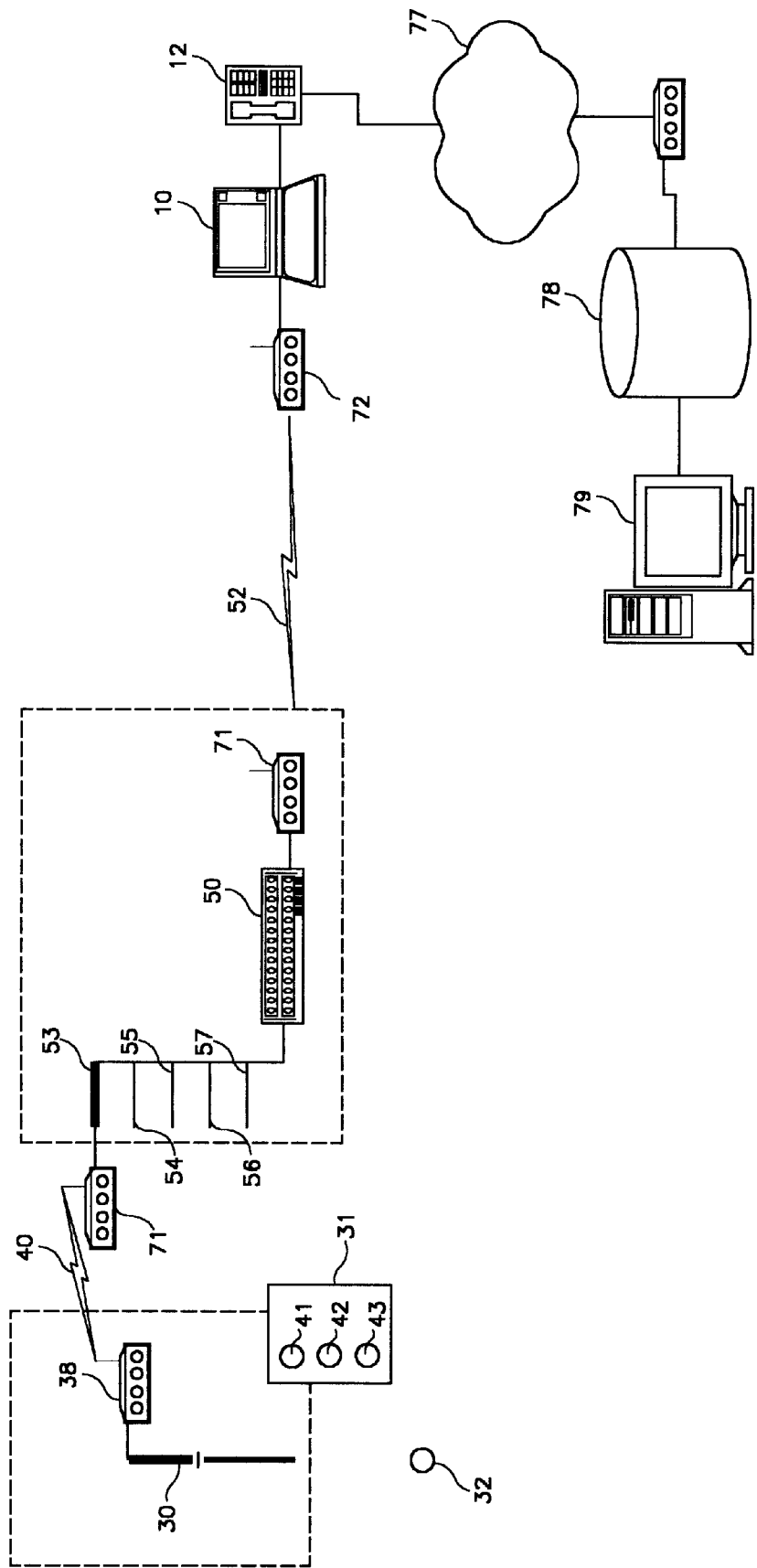
FIG. 12 is a schematic of the preferred embodiment.

The preferred embodiment is a data collection and management system for beef cattle production as indicated by FIG. 12. The components of the data collection and management system in the preferred embodiment include unique Radio Frequency Identification (RFID) transponders for each animal; an Action Card of RFID transponders to identify livestock events, an RFID Reader that can identify the animal and event RFID transponders; a wireless RFDC communication between the reader and a data consolidator unit which has multiple ports for livestock measurement data,; a multi-ported data concentrator unit for connection to a scale, a thermometer, an ultrasound measurement device, and an output device, a wireless RFDC communication between the data concentrator unit and the host computer, BeefLink™ Data Collection Software; and database protocol converter communication and integration tools.

Radio Frequency Identification (RFID) Transponders

Although the data collection system can operate manually with visual animal identification, the preferred operation is with Radio Frequency Identification (RFID) transponders 32 in the form of electronic ear tags, implants, boli or neck or leg collars to provide unique identification for each animal. Although ear tags and implants are the most common devices, a bolus transponder has been used successfully as a tamper-proof means of identification of cattle. The bolus transponder has the potential capability of measuring temperature and pH within the animal. The RFID transponders contain a small antenna attached to an integrated circuit that stores a unique identification number. Unlike bar codes, RFID transponders do not require line-of-sight to be read, the transponder simply needs to come into the proximity of an RFID reader.

RFID Reader

The RFID reader 30 will typically be stationary reader at high volume at the packer or feedlot operations and portable readers at the processing points. Stationary readers will be typically be connected to a host computer or data consolidator by means of a cable, but a wireless connection may also be used for stationary readers. The portable readers will typically use a wireless connection to the computer. The Readers emit a low radio frequency, typically a 134.2 kHz signal that excites the passive transponder in the event or animal identification tag. Once excited, the transponder responds back to the reader via radio frequency with a digital signal representing its unique identification. The reader decodes the signal, displays the identification, and sends the identification to the computer.

Work Card and Event Action Tags

A Work Card 31 with RFID transponders 41, 42 and 43 provides livestock event identification so that events can be read by the RFID reader rather than entered by keyboard. The user may select one or more event cards for the anticipated work session. Other event tags may be more permanently affixed at other convenient locations in the work area, such as around the processing chute. The tags on the work card have the name or symbol label for the corresponding events so that the person working the cattle can quickly scan the appropriate event when it occurs.

Data Concentrator

A hardware device called a Data Concentrator 50 is used as a hub to receive inputs from multiple peripherals and to send the data to the processing computer 10. Although the connection between the data concentrator and the computer may be cabled in some high volume applications, the preferred embodiment is radio frequency wireless data communication One communication port on the data concentrator will typically be dedicated to the RFDC transmitter/receiver, and the host computer will be ported to a transmitter/receiver. Serial data can be both transmitted and received between the computer and the concentrator using standard direct-connect serial cables or via radio frequency data communication (RFDC). The Data Concentrator accepts a signal from the reader through RFDC transmitter/receivers 36 and 71, typically from a serial port 53, and may also accept data from other measurement devices or provide data to output devices through other available ports 54, 55, 56, and 57. These devices can include electronic weigh scales for weighing animals, digital thermometers to determine if an animal has a fever, bar code scanners to scan drug containers, and ultrasound equipment to measure back fat and detect pregnancy. Other peripherals include output devices that notify the user of the results of an input such as a light, an audible signal to signify that the input has reached the computer, an LED display, or an electronic voice response. A preferred model of the data concentrator is Western Telematic Model STC61, which is a 6 serial port unit.

The Data Concentrator is linked to a host computer 10 through transmitter/receivers 36 and 71, by wireless radio frequency connection between radio frequency transmitter/receivers 71 and 72. The computer receives, processes, and stores the RFID scans and other data and generates a feedback confirmation signal back to the Data Concentrator.

The preferred computer is an IBM™-compatible desktop or laptop computer with a Windows™ 95 operating system.

BeefLink™ Data Collection Software

The BeefLink™ software running on the computer 10 validates inputs from the various devices, notifies the user of the data received, stores the results, and converts the data into meaningful information. In addition, the software manages the transfers of the local data via modem to regional and national databases for storage and further analysis, and manages the access to downstream processing, performance, and quality data.

Database Architecture and Data Transfer

Data collected at the local level can provide only limited management information to the producer because the producer needs to know the performance results in order to manage accurately for the future. As the data is transferred to a regional or national database, indicated in as 78, it can become more powerful. In many cases, the animals change hands during the production cycle. In order to get results back to the producers and growers of the livestock, these upstream participants must have the ability to pull information about the animals that the downstream participants enter into the system. Likewise, the downstream participants such as feedlots and packers need to review information on the animals that they are receiving. It is also these large databases that allow for the source verification for food safety issues.

The local software at each participant's facility routinely sends file updates to an alliance or national database using modem transfer through the Internet. With the proper security clearance, users can query the data on their own cattle even after they have been transferred or sold, and this is the information useful for future management decisions. Producers are also able to purchase reports that benchmark their animals against a compilation of blind data from other producers. For example, producers may compare their operations with operations of a similar size, geographic region, or breed for quality characteristics such as the tenderness score.

Once the animal reaches the slaughter plant, the same RFID transponder is used for identification. Stationary readers are used to read the transponders and to identify and sequence the carcasses. Data such as carcass weight, grade, and yield are collected and added to packer's management system, and that data can be accessed through the animal's identification.

Authorization Levels

In the preferred embodiment, authorization levels are provided for various entities such as a consultant, veterinarian, nutritionist, or banker, can access information according to that entity's authorization level.

Source Verification/Performance Tracking

In the preferred embodiment, the RFID tags, and visual identification tags are correlated so that at any point in the livestock cycle, historical data is available to any entity in the chain of title for the livestock.

At the packing plant, the animal's identification is used to record actual carcass quality data for the animal. The data can include overall evaluation of the carcass as well as information about the amount and quality of particular cuts or products derived from the carcass. This correlation of individual animal identification to actual carcass and product quality data permits the packer to compensate the producer or feedlot according to the actual quality of the product.

The producer benefits both by having the potential to receive a greater return for higher quality livestock, and by obtaining information which will permit more informed decisions on herd management. For instance, bulls or cows that produce calves with good yields and quality will be preferred for retention in the herd over bulls or cows that produce calves with lower yields or lower quality.

Whereas the prior art requires transmission of packer information back to the feedlot or to producers, the present invention permits entities in the chain of ownership to have access to the data associated with an animal. An additional objective of the invention is to provide Source Verification by making historical data for the animal available to the packer. This Source Verification will preferably include certified quality control programs such as HACCP plans.

What is claimed is:

1. A method for collecting livestock information comprising:

identifying each animal with a unique radio frequency identification transponder, such that the transponder provides a unique code when queried by a radio frequency identification reader unit, and that code identifies a particular animal;

reading the animal unique code with the radio frequency identification reader at the time of a key animal event;

uploading the animal unique code from the reader to a remote host computer by means of a wireless radio frequency connection;

entering data associated with the key animal event to the computer; and maintaining at least one database of events and measurement data for the animal, such that the data can be accessed according to the animal's unique code.

2. The method of claim 1 comprising the additional steps:

identifying one or more animal event with a unique radio frequency event identification transponder, such that the event identification transponder provides a unique animal event code when queried by the radio frequency identification reader unit, and that animal event code is cross referenced to an event so that it identifies a type of event;

reading the animal event unique code with the radio frequency identification reader at the time of a key animal event; and uploading the animal event code from the reader to the remote host computer by means of a wireless radio frequency connection.

3. The method of claim 2 wherein one or more animal event unique radio frequency identification transponder is affixed to a rigid surface and the reading of an animal event unique alphanumeric code is accomplished by placing the radio frequency identification reader in the proximity of the event transponder.

4. A method for collecting livestock information comprising:

identifying each animal with a unique radio frequency identification transponder, such that the transponder provides a unique code when queried by a radio frequency identification reader unit, and that code identifies a particular animal;

reading the animal unique code with the radio frequency identification reader at the time of a key animal event;

uploading the animal unique code from the reader to a remote host computer by means of a wireless radio frequency connection;

entering data associated with the key animal event to the computer;

maintaining, on the host computer and at least one other computer, a database of events and measurement data for the animal, such that the data can be accessed according to the animal's unique code; and communicating between the databases such that desired information is shared between the databases without the necessity of reentering data.

5. The method of claim 4 comprising the additional steps:

identifying one or more animal event with a unique radio frequency event identification transponder, such that the transponder provides a unique animal event code when queried by the radio frequency identification reader unit, and that unique animal event code identifies a type of event;

reading the animal event unique code with the radio frequency identification reader at the time of a key animal event; and uploading the animal event unique code from the reader to the remote host computer by means of a wireless radio frequency connection.

6. The method of claim 5 wherein one or more animal event unique radio frequency identification transponder is affixed to a rigid surface and the reading of an animal event unique code is accomplished by placing the radio frequency identification reader in the proximity of the event transponder.

7. The method of claim 6 comprising the additional step:

setting, before the event, at least one default data value for a key animal event, such that the default data value reflects the expected value of particular event data.

8. The method of claim 7 wherein the setting of the default data values is accomplished on a host computer.

9. The method of claim 7 wherein the setting of the default data values is accomplished at a livestock working location.

10. The method of claim 7 wherein the setting of the default data values is performed simultaneously for a group of animals.

11. The method of claim 4 wherein the animal identification data and animal event data value is captured with a multiple input/output device, such that the multiple input/output device can accept the animal unique code from radio frequency identification reader, the multiple input/output device can accept the unique code for at least one particular animal event code from the radio frequency identification reader, and the multiple input/output device can accept data from at least one livestock measuring device.

12. The method of claim 11 wherein the livestock measuring device is an electronic scale.

13. The method of claim 11 wherein the livestock measuring device is a digital thermometer.

14. The method of claim 11 wherein the livestock measuring device is an ultrasound device.

15. The method of claim 11 wherein the multiple input/output device provides a communication port to at least one output device.

16. The method of claim 4 wherein the radio frequency identification reader is capable of reading radio frequency identification transponders of more than one type.

17. The method of claim 4 comprising the additional steps:

maintaining portions of the data related to a particular animal on a first data base;

maintaining portions of the data related to a particular animal on a second data base; and communicating between the first data base and the second data base by means of a data protocol converter such that the converter allows data from the first database to be accessed and used in the second database, and the converter allows data from the second database to be accessed and used in the first database.

18. The method of claim 4 comprising the additional step:

providing a feedback confirmation signal from the host computer to a feedback means located in the proximity of the reader, such that the feedback means confirms the receipt of data at the host computer.

19. The method of claim 18 comprising the additional step:

comparing the data, at the host computer, to preset data range limits and providing the feedback confirmation signal if the data is within the range limits.

20. The method of claim 18 wherein the feedback means is located on the reader.

21. The method of claim 18 wherein the feedback means is attached to a multiple input/output device.

22. The method of claim 18 wherein the feedback means is at least one light.

23. The method of claim 18 wherein the feedback means is an audible signal.

24. The method of claim 23 wherein the audible signal is provided to wireless headphones.

25. The method of claim 18 wherein the feedback means is at least one light emitting diode.

26. The method of claim 18 wherein the feedback means is a printer.

27. The method of claim 4 wherein the radio frequency identification transponder is integral to an ear tag.

28. The method of claim 4 wherein the radio frequency identification transponder is implanted in the animal.

29. The method of claim 4 wherein the radio frequency identification transponder is integral to a ruminal bolus.

30. The method of claim 4 wherein the radio frequency identification transponder is integral to a collar.

31. A method for collecting and managing livestock information comprising:

identifying each animal with a unique radio frequency identification transponder, such that the transponder provides a unique code when queried by a radio frequency identification reader unit, and that code identifies a particular animal;

identifying one or more livestock event with a unique radio frequency identification transponder, such that the transponder provides a unique code when queried by the radio frequency identification reader unit, and that code identifies the particular event;

reading the animal unique code with the radio frequency identification reader at the time of a key animal event;

reading the event unique code with the radio frequency identification reader at the time of a key animal event;

obtaining livestock measurement data associated with the key animal event through a multiple input/output device such that the device accepts a signal from the radio frequency identification reader through one port, and the device accepts livestock measurement data through at least one other port;

uploading the animal unique alphanumeric code, the event unique code, and the livestock measurement data associated with the event from the multiple input/output device to a remote host computer by means of a wireless radio frequency connection;

providing a feedback means such that the host computer verifies receipt of data by sending a signal by means of a wireless radio frequency connection to the multiple input/output device, and the feedback means is ported to the multiple input/output device; and maintaining, on the host computer a database of livestock events and measurement data for the animal, such that the data can be accessed according to the animal's unique code.

32. The method of claim 31 wherein one or more animal event unique radio frequency identification transponder is affixed to a rigid surface and the reading of an animal event unique code is accomplished by placing the reader in the proximity of the event transponder.

33. The method of claim 31 comprising the additional step:

setting, before the event, at least one default data value for a key animal event, such that the default data value reflects the expected value of particular event data so the default value may either be accepted or superceded at the time of the event.

34. The method of claim 31 wherein the reader is portable; and the reader communicates with the multiple input/output device by a radio frequency data communications means.

35. The method of claim 31 wherein the reader is portable; and the reader communicates with the multiple input/output device by a cable means.

36. The method of claim 31 comprising the additional steps:

maintaining portions of the data related to a particular animal on a first data base;

maintaining portions of the data related to a particular animal on a second data base; and communicating between the first data base and the second data base by means of a data protocol converter such that the converter allows data from the first database to be accessed and used in the second database, and the converter allows data from the second database to be accessed and used in the first database.

37. The method of claim 31 comprising the additional steps:

assigning authorization levels to the animal identification and animal event data; and restricting access to the animal identification and animal event data according to the authorization level.

38. The method of claim 31 comprising the additional steps:

identifying an animal with a visual identification code;

entering the visual identification code to the host computer such that animal event data may be accessed by the visual identification code.

39. A method for collecting and managing livestock information comprising:

Identifying each animal with a unique radio frequency identification transponder, such that the transponder provides a unique code when queried by a radio frequency identification reader unit, and that code identifies a particular animal;

identifying one or more livestock event with a unique radio frequency identification transponder, such that the transponder provides a unique code when queried by the radio frequency identification reader unit, and that code identifies the particular event;

reading the animal unique code with the radio frequency identification reader at the time of a key animal event;

setting, before the key animal event, at least one default data value for a key animal event, such that the default data value reflects the expected value of particular event data so the default value may either be accepted or superceded at the time of the key animal event;

reading the event unique code with the radio frequency identification reader at the time of a key animal event;

obtaining livestock measurement data associated with the key animal event through a multiple input/output device such that the device accepts a signal from the radio frequency identification reader through one port, and the device accepts livestock measurement data through at least one other port;

uploading the animal unique alphanumeric code, the event unique code, and the livestock measurement data associated with the event from the multiple input/output device to a host computer;

providing a feedback means such that the host computer verifies receipt of data by sending a signal to the multiple input/output device, and the feedback means is ported to the multiple input/output device; and maintaining, on the host computer a database of livestock events and measurement data for the animal, such that the data can be accessed according to the animal's unique code.

* * * * *